United States Patent
Fernando et al.

(10) Patent No.: US 12,519,628 B2
(45) Date of Patent: Jan. 6, 2026

(54) TOKEN RECOVERY

(71) Applicant: Coinbase, Inc., Oakland, CA (US)

(72) Inventors: Gabriel Emilio Fernando, Garden City, NY (US); Sophia Luxi Wu, San Francisco, CA (US); Vignesh Muralidharan, Seattle, WA (US); Dawid Kostek, Bellmore, NY (US)

( * ) Notice: Subject to any disclaimer, the term of this patent is extended or adjusted under 35 U.S.C. 154(b) by 399 days.

(21) Appl. No.: 17/981,331

(22) Filed: Nov. 4, 2022

(65) Prior Publication Data

US 2024/0154800 A1    May 9, 2024

(51) Int. Cl.
  *H04L 9/08*      (2006.01)
(52) U.S. Cl.
  CPC ................................ *H04L 9/088* (2013.01)
(58) Field of Classification Search
  CPC .. G06Q 2220/00; G06Q 20/3829; H04L 9/50; H04L 2209/56
  See application file for complete search history.

(56) References Cited

U.S. PATENT DOCUMENTS

| | | | |
|---|---|---|---|
| 2018/0240107 A1* | 8/2018 | Andrade | G06Q 20/065 |
| 2020/0005282 A1* | 1/2020 | Kim | G06Q 20/065 |
| 2020/0202336 A1* | 6/2020 | Walters | G07G 1/01 |
| 2021/0105142 A1* | 4/2021 | Lee | H04L 9/3247 |
| 2021/0383334 A1* | 12/2021 | Krasnyansky | G06Q 20/02 |
| 2021/0409226 A1* | 12/2021 | Asa | H04L 9/3239 |
| 2022/0012731 A1* | 1/2022 | DeRosa-Grund | G06F 16/2365 |

* cited by examiner

*Primary Examiner* — Patrick Mcatee
*Assistant Examiner* — Sima Asgari
(74) *Attorney, Agent, or Firm* — Holland & Hart LLP

(57) ABSTRACT

To support token recovery at a token management system, a custodial token platform may receive via a user interface, an identifier of a first blockchain transaction that is associated with a crypto token that is not supported by the custodial token platform and that is to be recovered from an inbound address of the custodial token platform. Information associated with the first blockchain transaction may be displayed, and the user interface may receive an indication of a user address associated with a user and that is external to the custodial token platform. The custodial token platform may verify the user address using a signed message and may broadcast, subsequent to verifying that the message is signed, a second blockchain transaction configured to transfer the crypto token from the inbound address to the user address.

20 Claims, 9 Drawing Sheets

TOKEN RECOVERY

FIELD OF TECHNOLOGY

The present disclosure relates generally to token management, and more specifically to token recovery.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
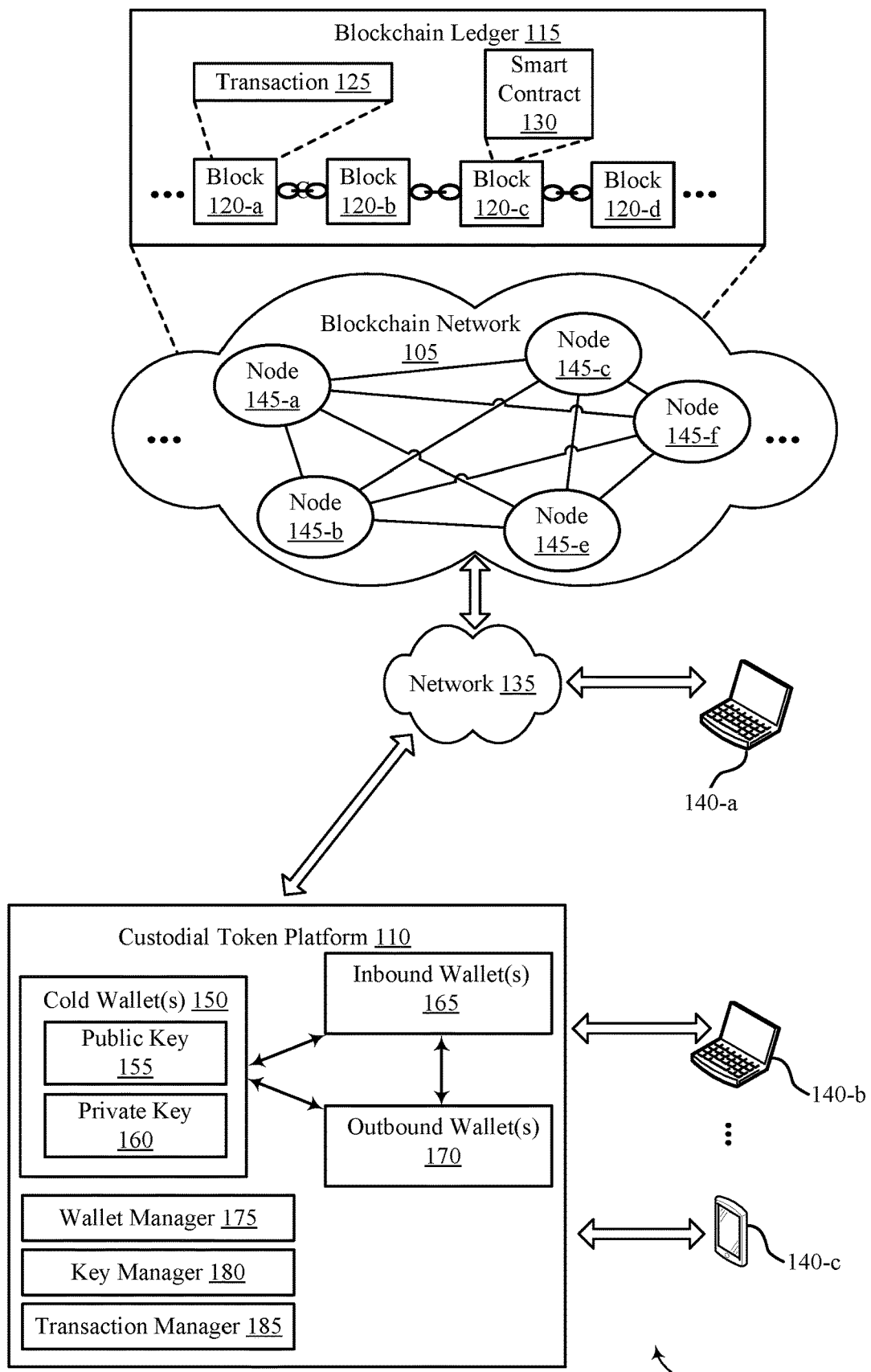
FIG. 1 illustrates an example of a digital token management system that supports token recovery in accordance with aspects of the present disclosure.

A user may access a custodial token platform to purchase, sell, exchange, or trade digital assets, such as cryptocurrencies, crypto tokens, or the like. In some examples, a particular exchange platform may support purchasing, selling, or trading a particular subset of crypto assets or crypto tokens that exist. Further, users of the custodial token platform may transmit unsupported tokens to a platform-controlled wallet (e.g., a non-custodial wallet, as described herein) associated with the user. However, because the tokens are unsupported by the exchange platform, the user and the platform may be limited in accessing the unsupported assets. As such, these transfers may result in loss of crypto tokens by users.

Techniques described herein address the foregoing by supporting recovery of tokens that have been transmitted to a wallet address that is associated with a custodial token platform that does not support the token. For example, the custodial token platform may provide a service and a user interface for asset recovery. A user may enter an identifier of a blockchain transaction that corresponds to the transfer to the non-custodial address. In some examples, the service displays information associated with the transaction that is retrieved based on the identifier. The user may then verify or accept the information and may enter a wallet address that is associated with the user and is external to the custodial token platform. The user may then sign a message using a private key associated with the wallet address such that the custodial token platform can verify the user owns the address. The service may then broadcast a transaction that is configured to transfer the crypto token from the inbound address to the user address.

Additionally, to avoid double crediting user accounts during a backfilling procedure, the custodial token platform may maintain a log of transactions associated with recovered crypto tokens. Thus, when a backfill procedure is performed, the procedure may skip backfilling the recovered tokens. Further, the custodial token platform may monitor, via a blockchain ledger, inbound addresses for transactions associated with unsupported tokens. If a transferred token does not match one of the tokens in a list of supported tokens, then the custodial token platform may determine to refrain from moving the token to another wallet managed by the custodial token platform, such as a cold wallet or an outbound wallet. These and other techniques are described in further detail with respect to the figures.

Aspects of the disclosure are initially described in the context of an environment supporting token management. Aspects of the disclosure are further described with respect to a computing environment supporting token recovery and a process flow diagram illustrating example operations and communications for token recovery. Aspects of the disclosure are further illustrated by and described with reference to apparatus diagrams, system diagrams, and flowcharts that relate to token recovery.

FIG. 1 illustrates an example of computing environment 100 that supports token recovery in accordance with various aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145-*c* may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract is called by another device.

The blockchain ledger 115 and the blockchain network 105 may be associated with both layer one (L1) and layer two (L2) crypto tokens. The smart contract or decentralized application may issue layer two tokens to various users based on various conditions, and the users may transact using the layer two tokens, but transaction fees may be based on the layer one token (or a derivative thereof). Thus, the blockchain ledger 115 may maintain transaction records associated with both layer one and layer two tokens. Further, the blockchain network 105 may generate, store, process, and verify transactions associated with both layer one and layer two tokens.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

In some examples, a user of the custodial token platform 110 may deposit a crypto token in an inbound wallet 165. However, the crypto token may not be supported by the custodial token platform, meaning that the token is not tradable on the custodial token platform 110 or is not accessible via the custodial token platform 110. Techniques described herein support recovery of the deposited crypto token by a user using a service provided by the custodial token platform 110. For example, a user may enter a transaction identifier associated with the deposited crypto token into a user interface supported by the custodial token platform 110. The custodial token platform 110 (e.g., the transaction manager 185) may identify the corresponding transaction via the blockchain ledger (e.g., the blockchain ledger 115) associated with the crypto token and retrieve information associated with the transaction via the blockchain ledger. The information may be displayed to the user for confirmation. The user may then enter a wallet address for an external wallet of the user and sign a message associated with the wallet address for verification of the wallet address by the custodial token platform 110. The custodial token platform 110 (e.g., the transaction manager 185) may then generate a transaction and broadcast a transaction via the blockchain network 105 such that the crypto token is transferred to the external wallet of the user.

It should be appreciated by a person skilled in the art that one or more aspects of the disclosure may be implemented in a computing environment 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
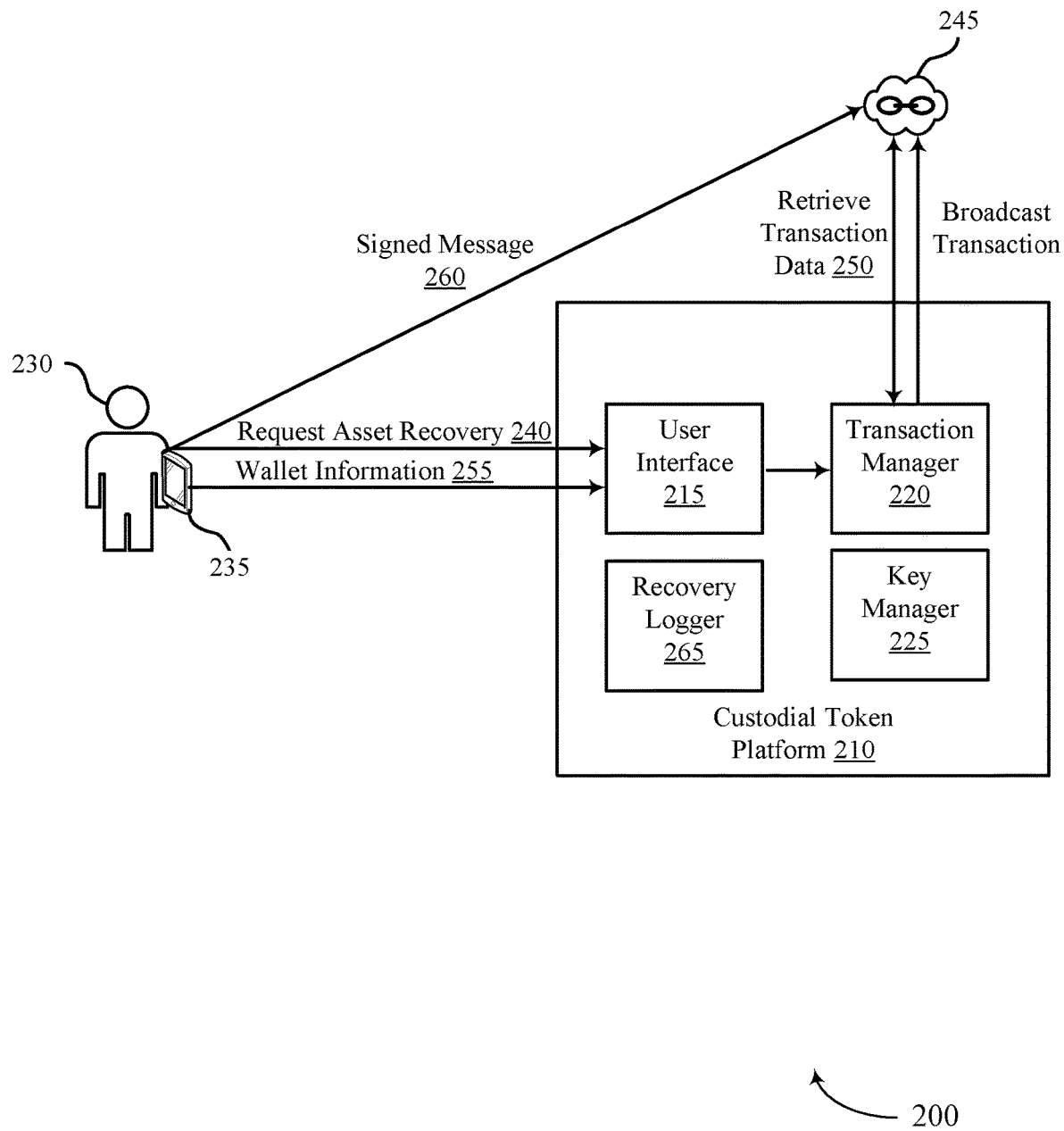
FIG. 2 illustrates an example of a computing environment that supports token recovery in accordance with aspects of the present disclosure.

FIG. 2 illustrates an example of a computing environment 200 that supports token recovery in accordance with aspects of the present disclosure. The computing environment 200 includes a custodial token platform 210 and a user 230 with a user device 235. The custodial token platform 210 may be an example of the custodial token platform 110 as described with respect to FIG. 1.

As described with respect to FIG. 1, the custodial token platform 210 may support exchanging a set of crypto tokens and may not support another set of crypto tokens, meaning that the crypto tokens are not available for purchasing, trading, access, etc. on the custodial token platform 210. As part of a send and receive process supported by the custodial token platform 210, the custodial token platform 210 may provide customers (e.g., the user 230) blockchain address where the customers can deposit crypto tokens and receive credit in the associated accounts. However, as described herein, users may send unsupported assets (e.g., crypto tokens) to those addresses. Since the crypto tokens are unsupported, the infrastructure of the custodial token platform 210 may not support techniques to send assets back to the users. Further, though the custodial token platform 210 may maintain the private keys associated with the addresses, the tokens may be "stuck" on those addresses.

As the custodial token platform 210 may support thousands or millions of customers, stuck tokens may be significant and lead to loss of customers, business, as well as increased resource overhead in the custodial token platform 210 dealing with complaints. Further, one of the tenants of cryptocurrency and related fields is economic freedom. However, in some systems, users may be more likely to misuse or lose cryptocurrency than fiat money. As cryptocurrency usage and networks and protocol expands, the quantity of cases and lost assets continues to grow.

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, typically using a smart contract or a decentralized application ("Dapp"). The smart contract or decentralized application may issue layer two tokens to various users based on various conditions, and the users may transact using the layer two tokens, but transaction fees may be based on the layer one token (or a derivative thereof). In some examples, the unsupported crypto tokens that are sent to the custodial token platform 210 are layer two tokens. This may occur because the layer one tokens and the layer two tokens may use the same wallet addresses (e.g., a shared address space). More particularly, the custodial token platform 110 may support the layer one token, but not the layer two token. As such, the layer two token may be transmitted to the address associated with the layer one token. In other cases, a token may be "airdropped" to retail addresses (e.g., addresses managed by the custodial token platform 110), or a user may send an old or forked version of a token to the address managed by the custodial token platform 110. Further, in some cases, users may link uniform resource locator (URL) addresses (or blockchain supported namespace) to their addresses managed by the custodial token platform 110, and these addresses may be used to receive tokens that are unsupported.

Techniques described herein may resolve these issues by providing a service, via the custodial token platform 210, for recovery of a crypto token that is not supported by the custodial token platform 210. In some examples, for various legal and technical reasons, the recovery procedure is not automatic, but is rather triggered by a user. In the example of FIG. 2, the user 230 has sent a crypto asset to the custodial token platform 210, and the crypto token is not supported by the custodial token platform 210. The user 230 may access the crypto token recovery service using the user device 235, which may be an example of a computing device 140 of FIG. 1. The user may activate the recovery procedure and provide the transaction identifier associated with the transfer of the unsupported crypto token to the custodial token platform 210. That is, at 240, the user may request asset recovery and provide the transaction identifier. For example, the user locates the transaction using the wallet address that sent the transaction and via a block explorer or wallet service. The user copies and pastes the transaction identifier into a user interface 215 of the custodial token platform 210.

After receiving the transaction identifier at the user interface 215, a transaction manager 220 of the custodial token platform 210 may, at 250, retrieve the information associated with the transaction from the blockchain ledger 245. The information may include an identifier for the token, an amount transferred, fees paid, timestamp, recipient address, etc. The information may be displayed to the user via the user interface 215 such that the user can verify that the information is correct. After verification, the user interface 215 may prompt for the user 230 to enter a user address associated with a wallet that is external to the custodial token platform 210. The wallet is external to the custodial token platform 210 because the custodial token platform 210 does not manage the private keys for the user address, as is the case with a non-custodial wallet.

After (e.g., in response to) receiving the wallet information at 255, the custodial token platform 210 may perform a verification procedure to verify the user address. The custodial token platform 210 may verify the address for various reasons, including legal reasons (e.g., know your customer (KYC) laws). Thus, the custodial token platform 210 may require that the user 230 (e.g., using the wallet platform associated with the user address), transmit a signed message, meaning that a message is signed using a private key associated with the provided user address. At 260, the signed message may be broadcast and stored on the blockchain ledger 245. The transaction manager 220 may retrieve the signed message for verification. In some examples, the signed message is transmitted to the custodial token platform 210 rather than the blockchain ledger 245.

Subsequent to (e.g., in response to) verifying that the message is validly signed, the transaction manager may generate a blockchain transaction that is configured to transmit the crypto token to the user address. The user interface 215 may display information associated with the blockchain transaction such that the user 230 may verify the information including the amount to transfer, the recipient address, and network fees (e.g., transfer fees). Thus, the transaction manager 220 may generate an estimation of network fees that are to be paid by the customer and the network fees may be based on current blockchain network usage. In some examples, the custodial token platform 210 may determine the suggested network fees (e.g., a base fee) then add additional fee to cover any other potential transfer costs, such that the additional fees are covered by the customer rather than the custodial token platform 210.

If the user 230 approves the displayed information associated with the generated blockchain transaction, then the transaction manager 220 may broadcast the transaction such as to cause transfer of the crypto token to the user address, as described herein. For example, the user may click or otherwise activate an accept button, and the transaction manager 220 may sign the transaction using a key retrieved via the key manager 225 and corresponding to a wallet that is to transmit the transaction. The transaction is broadcast via the blockchain network such that the network may verify the transaction and add the transaction to the blockchain ledger such that the crypto token is credited to the user address.

In some examples, the custodial asset platform 210 may add support for a crypto token that was previously unsupported. In such cases, the custodial token platform 210 may perform a backfill procedure to credit user accounts with the amount of the now supported crypto token asset that was previously deposited (e.g., when the crypto token was unsupported). As such, in order to avoid crediting the customer twice, the custodial token platform 210 may implement recovery logger 265 to log recovered assets. That is, without logging the recovery, the backfill procedure may credit the user account with the crypto token even though the user has already recovered the asset to the external user address. As such, the logging may be performed so that the backfill procedure does not credit recovered assets. Accordingly, after successful recovery of a crypto token using the techniques described herein, the recovery logger 265 may document transaction details, such as an identifier for the crypto token, an amount of the crypto token transferred, an identifier of the user, or a combination thereof. During or before execution, the backfill procedure may check the recovery log to avoid crediting user accounts with already recovered assets. The backfill procedure may transfer or credit crypto tokens to custodial user accounts and skip crediting of amounts corresponding to recovered assets.

The custodial asset platform 210 may also implement a monitoring process such as to prevent moving unsupported assets to other wallets or addresses supported by the custodial asset platform 210. For example, the transaction manager 220 may monitor inbound addresses (e.g., the inbound wallet 165 of FIG. 1) for transactions and compare received tokens to a list of tokens supported by the custodial token platform. If a received token is not supported, the inbound wallet may flag the address, wallet, and/or token. During a flush procedure, which may move tokens between inbound addresses and outbound addresses of the custodial asset platform 210, the address may be skipped or the tokens may not be moved. That is, the custodial asset platform 210 may determine to refrain from generating/broadcasting (moving) a transaction that moves the crypto token from the inbound address to another address managed by the custodial token platform 110, such as an outbound address. In some cases, based on monitoring, the custodial token platform 110 may notify the user of the unsupported asset.

Various techniques may be implemented to support improved security in the token recovery process. For example, the recovery request may be protected by a two-factor authentication (2FA) mechanism. Additionally, some users may be blocked for sends/receives for various reasons, and these users may be similarly blocked from using the token recovery procedure. Further, after completion of the recovery procedure (e.g., broadcast of the transaction), users may be notified of completion, such as via email, push notifications, text messages, or the like. In some examples, there may be delay included between the recovery request and broadcast of the transaction in order to reduce the risk of abuse of the recovery procedure and lower the risk of malicious recovery. In some cases, the recovery procedure may not be available for a predefined time period after the unsupported transaction occurred. For example, the recovery procedure may not be available until twelve hours or one day after the crypto token transfer transaction. Additionally, the custodial token platform may maintain a counter per user and a configurable limit on the quantity of times a user can utilize the recovery procedure. In some examples, a user may enter a maximum network fee (e.g., gas fee) or fee that the user is willing to pay to recover the assets. In such cases, the custodial token platform 210 may not perform the transfer if the estimated network fee exceeds the user defined maximum fee.

In some examples, a recovery request may trigger a flush (e.g., transfer from the inbound address to an outbound address) on the inbound address associated with the transaction to ensure that no other known or supported tokens are in the address. Additionally, the custodial token platform may determine whether there are enough tokens attributed to the address to cover potential transfer/network fees. The recovery request may also trigger a balance check (e.g., a ERC 20 balanceOf contract function) at a smart contract associated with the crypto token to be recovered in order to guard against rebasing of the token where account balances may change without a transfer call. Thus, this technique retrieves the live balance of the contract directly from a node. Accordingly, when the custodial token platform 210 identifies the transaction information, the custodial token platform may also identify the smart contract that supports the token (e.g., based on the transaction information). The custodial token platform may then call the "balanceOf" function to identify the correct balance. When the transaction is broadcast to recover the tokens, the custodial token platform may call a transfer function (e.g., an ERC 20 transfer ( )) at the smart contract to transfer the full amount of the crypto tokens to the requested address. Additionally, or alternatively, the wallet orchestrator 240 may utilize the transaction value of the original transaction for the recovery transaction In some examples, the custodial token platform 210 may maintain an allow list and/or a block list for crypto tokens that are supported by the recovery procedure to support increased security at the custodial token platform 210. In some examples, whether a token is included in the allow or block list is based on a risk profile associated with the crypto token. In some examples, a relative risk associated with a crypto token may be determined using another procedure, such as a procedure that utilizes a machine learning model. Additionally, or alternatively, the machine learning model may be used or activated with the recovery procedure to determine whether a token is safe for recovery.

Figure 3:
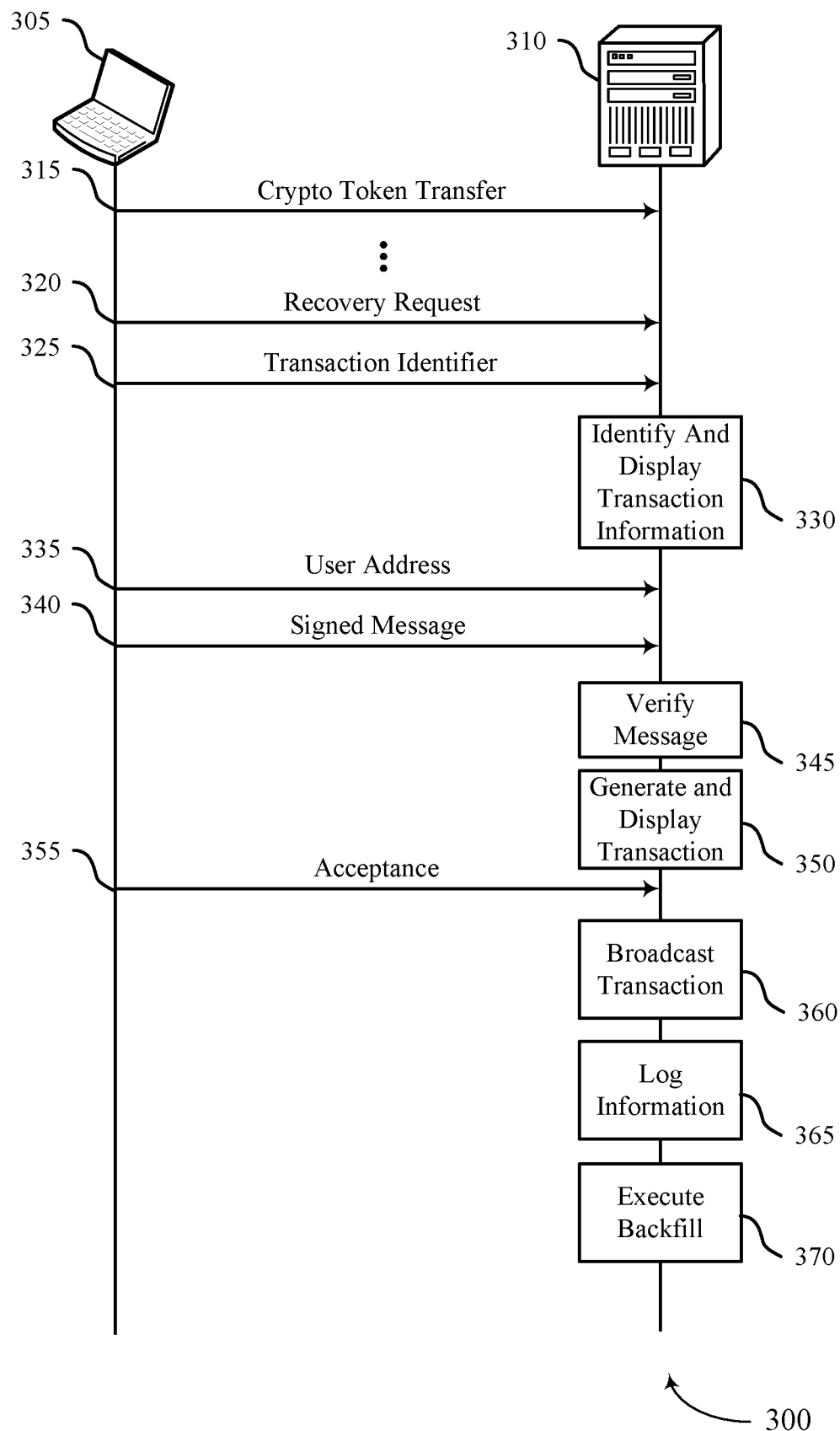
FIG. 3 illustrates an example of a process flow that supports token recovery in accordance with aspects of the present disclosure.

FIG. 3 illustrates an example of a process flow 300 that supports token recovery in accordance with aspects of the present disclosure. The process flow 300 includes a user device 305 and a server 310. The user device 305 may be an example of a user device 235 as described with respect to FIG. 2 or a computing device 140 as described with respect to FIG. 1. The server 310 may be represent various physical and logical computing components that support a custodial token platform, which may be an example of the custodial token platform 110 and 210, as described with respect to FIGS. 1 and 2. In the following description of the process flow 300, the operations between the user device 305 and the server 310 may be transmitted in a different order than the example order shown, or the operations performed may be performed in different orders or at different times. Some operations may also be omitted from the process flow 300, and other operations may be added to the process flow 300.

At 315, a first blockchain transaction may transfer a crypto token to the custodial token platform associated with the server 310. In some examples, the crypto token is not supported by the custodial token platform, meaning that the crypto token is not purchasable, tradable, or sellable on the custodial token platform, that the token is not available for sending/receiving on the corresponding blockchain using the custodial token platform, and/or that the custodial token platform does not listen for receipt of such tokens on the corresponding blockchain and credit user accounts for the receipt of such tokens. However, such tokens may be available for recovery, as described herein. Further, the crypto token may not be accessible via a user account or wallet supported by the custodial token platform. However, the token may be transmitted to an inbound address (e.g., a wallet address) associated with the user. The crypto token may be a fungible token, a non-fungible token, or a layer two token.

At 320, the user device 305 may transmit a recovery request to the custodial token platform associated with the server 310. For example, the user may navigate to an asset recovery page supported by the custodial token platform and click or activate a user interface component associated with the recovery procedure.

At 325, the custodial token platform may receive, from the user device 305 via a user interface of the custodial token platform, an identifier of the first blockchain transaction that is associated with the crypto token that is not supported by the custodial token platform and that is to be recovered from the inbound address of the custodial token platform. In some examples, the user interface prompts for the transaction identifier.

At 330, the custodial token platform may identify and display, based at least in part on receiving the identifier for the first blockchain transaction, information associated with the first blockchain transaction. The information may be identified from a blockchain associated with the first blockchain transaction. For example, using the transaction identifier, the custodial token platform may retrieve information associated with the transaction, such as token identifier, transaction amount, fees paid, etc. and display such information to the user via the user interface.

At 335, the custodial token platform may receive, via the user interface, an indication of a user address associated with the user. For example, the user interface prompts for the user address. The user address may be external to the custodial token platform, meaning that the custodial token platform does not control or have access to the private key associated with the user address. The user address may be referred to the user's self-custodial address, meaning that the user has access to the private key associated with the address.

At 340, the custodial token platform may receive or identify a signed message. The message may be digitally signed using a private key associated with the user address that the user provided (e.g., the user's self-custodial address). At 345, the custodial token platform may verify, based at least in part on receiving the indication of the user address, that the message is signed by the private key associated with the user address.

At 350, the custodial token platform may generate and display, subsequent to or in response to verifying that the message is signed, a second blockchain transaction that is configured to transfer the crypto token from the inbound address to the user address. The second blockchain transaction may include a transferee fee associated with the blockchain. In some examples, the custodial asset platform may determine a suggested network fee (e.g., a base fee) that is suggested by the network associated with the blockchain. The custodial token platform may also add some additional fee for the recovery procedure or to cover any additional unforeseen network fees. The custodial token platform may display information associated with the second blockchain transaction, and the information may include an indication of the transfer fee.

At 355, the custodial token platform may receive, at the user interface, an indication of acceptance of the information associated with the second blockchain transaction. For example, the user may select or activate a button or user interface component to accept the details of the generated transaction.

At 360, the custodial token platform may broadcast, subsequent to verifying that the message is signed, the second blockchain transaction that is configured to transfer the crypto token from the inbound address to the user address.

At 365, the custodial token platform may log, subsequent or in response to broadcasting the second blockchain transaction, information associated with the second blockchain transaction in a backfill transaction log. The logged information may include an identifier for the crypto token, an amount of the crypto token transferred via the second blockchain transaction, an identifier of a user associated with the user address, or a combination thereof.

At 370, the custodial token platform may execute, subsequent to adding support for the crypto token at the custodial token platform, a backfill procedure that credits respective amounts of the crypto token to a plurality of user accounts managed by the custodial token platform. The backfill procedure may use the backfill transaction log to skip crediting of the respective amounts of the crypto token corresponding to the first blockchain transaction.

Figure 4:
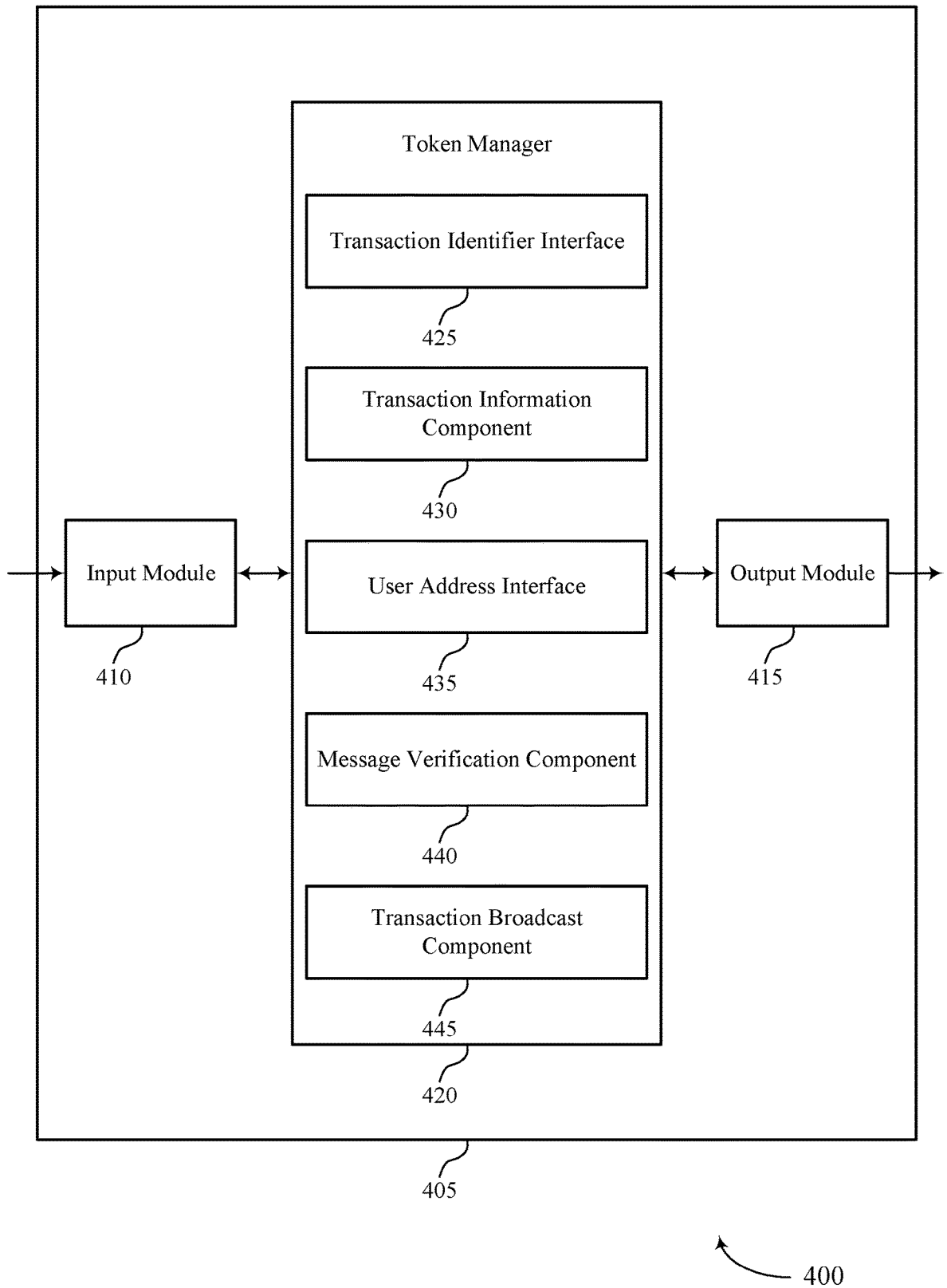
FIG. 4 illustrates a block diagram of an apparatus that supports token recovery in accordance with aspects of the present disclosure.

FIG. 4 illustrates a block diagram 400 of a system 405 that supports token recovery in accordance with aspects of the present disclosure. The system 405 may include an input interface 410, an output interface 415, and a token manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the token manager 420 to support token recovery. In some cases, the input interface 410 may be a component of a network interface 615 as described with reference to FIG. 6.

The output interface 415 may manage output signaling for the system 405. For example, the output interface 415 may receive signaling from other components of the system 405, such as the token manager 420, and may transmit such output signaling corresponding to (e.g., representative of or otherwise based on) such signaling to other systems or devices. In some cases, the output interface 415 may be a component of a network interface 615 as described with reference to FIG. 6.

The token manager 420 may include a transaction identifier interface 425, a transaction information component 430, a user address interface 435, a message verification component 440, a transaction broadcast component 445, or any combination thereof. In some examples, the token manager 420, or various components thereof, may be configured to perform various operations (e.g., receiving, monitoring, transmitting) using or otherwise in cooperation with the input interface 410, the output interface 415, or both. For example, the token manager 420 may receive information from the input interface 410, send information to the output interface 415, or be integrated in combination with the input interface 410, the output interface 415, or both to receive information, transmit information, or perform various other operations as described herein.

The token manager 420 may support digital token management in accordance with examples as disclosed herein. The transaction identifier interface 425 may be configured as or otherwise support a means for receiving, via a user interface of a custodial token platform, an identifier of a first blockchain transaction that is associated with a crypto token that is not supported by the custodial token platform and that is to be recovered from an inbound address of the custodial token platform. The transaction information component 430 may be configured as or otherwise support a means for displaying, based on receiving the identifier of the first blockchain transaction, information associated with the first blockchain transaction, the information identified from a blockchain associated with the first blockchain transaction. The user address interface 435 may be configured as or otherwise support a means for receiving, via the user interface, an indication of a user address associated with a user, the user address being external to the custodial token platform. The message verification component 440 may be configured as or otherwise support a means for verifying, based on receiving the indication of the user address, that a message is signed by a private key associated with the user address. The transaction broadcast component 445 may be configured as or otherwise support a means for broadcasting, subsequent to verifying that the message is signed, a second blockchain transaction configured to transfer the crypto token from the inbound address to the user address.

Figure 5:
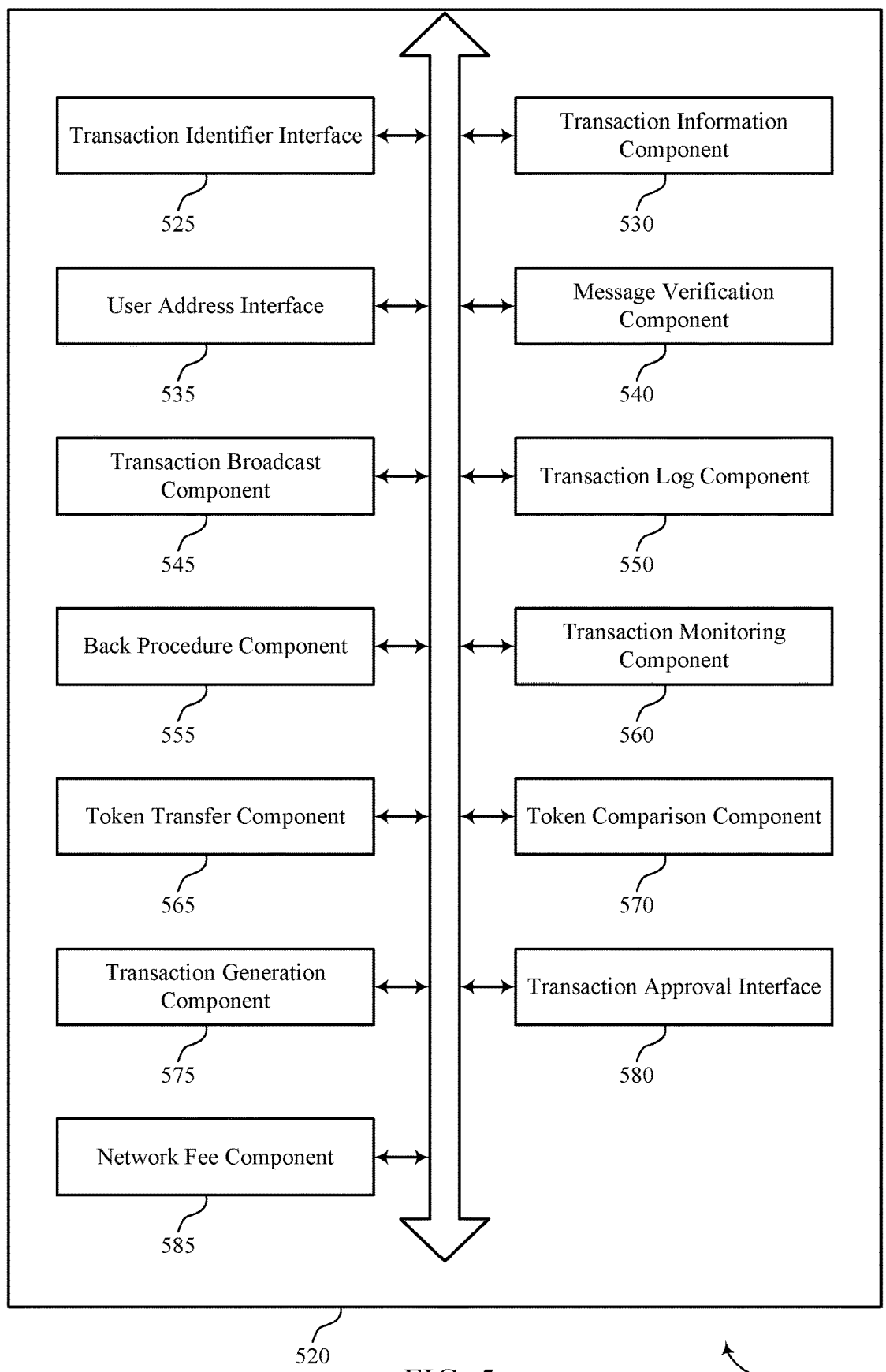
FIG. 5 illustrates a block diagram of a token manager that supports token recovery in accordance with aspects of the present disclosure.

FIG. 5 illustrates a block diagram 500 of a token manager 520 that supports token recovery in accordance with aspects of the present disclosure. The token manager 520 may be an example of aspects of a token manager 420, as described herein. The token manager 520, or various components thereof, may be an example of means for performing various aspects of token recovery as described herein. For example, the token manager 520 may include a transaction identifier interface 525, a transaction information component 530, a user address interface 535, a message verification component 540, a transaction broadcast component 545, a transaction log component 550, a back procedure component 555, a transaction monitoring component 560, a token transfer component 565, a token comparison component 570, a transaction generation component 575, a transaction approval interface 580, a network fee component 585, or any combination thereof. Each of these components may communicate, directly or indirectly, with one another (e.g., via one or more buses, communications links, communications interfaces, or any combination thereof).

The token manager 520 may support digital token management in accordance with examples as disclosed herein.

The transaction identifier interface 525 may be configured as or otherwise support a means for receiving, via a user interface of a custodial token platform, an identifier of a first blockchain transaction that is associated with a crypto token that is not supported by the custodial token platform and that is to be recovered from an inbound address of the custodial token platform. The transaction information component 530 may be configured as or otherwise support a means for displaying, based on receiving the identifier of the first blockchain transaction, information associated with the first blockchain transaction, the information identified from a blockchain associated with the first blockchain transaction. The user address interface 535 may be configured as or otherwise support a means for receiving, via the user interface, an indication of a user address associated with a user, the user address being external to the custodial token platform. The message verification component 540 may be configured as or otherwise support a means for verifying, based on receiving the indication of the user address, that a message is signed by a private key associated with the user address. The transaction broadcast component 545 may be configured as or otherwise support a means for broadcasting, subsequent to verifying that the message is signed, a second blockchain transaction configured to transfer the crypto token from the inbound address to the user address.

In some examples, the transaction log component 550 may be configured as or otherwise support a means for logging, subsequent to broadcasting the second blockchain transaction, information associated with the second blockchain transaction in a backfill transaction log. In some examples, the back procedure component 555 may be configured as or otherwise support a means for executing, subsequent to adding support for the crypto token at the custodial token platform, a backfill procedure that transfers respective amounts of the crypto token to a set of multiple custodial user addresses managed by the custodial token platform, where the backfill procedure uses the backfill transaction log to skip crediting of the respective amounts of the crypto token corresponding to the first blockchain transaction.

In some examples, to support logging the second blockchain transaction, the transaction log component 550 may be configured as or otherwise support a means for logging an identifier for the crypto token, an amount of the crypto token transferred via the second blockchain transaction, an identifier of a user associated with the user address, or a combination thereof.

In some examples, the transaction monitoring component 560 may be configured as or otherwise support a means for monitoring the blockchain for transactions associated with the inbound address. In some examples, the token transfer component 565 may be configured as or otherwise support a means for identifying, based on monitoring the blockchain, that the crypto token is transferred to the inbound address. In some examples, the token comparison component 570 may be configured as or otherwise support a means for comparing the crypto token to a list of crypto tokens supported by the custodial token platform. In some examples, the token transfer component 565 may be configured as or otherwise support a means for determining, based on a result of the comparing, to refrain from moving the crypto token from the inbound address to another address managed by the custodial token platform.

In some examples, the transaction generation component 575 may be configured as or otherwise support a means for generating, subsequent to verifying that the message is signed, the second blockchain transaction including a transfer fee associated with the blockchain. In some examples, the transaction information component 530 may be configured as or otherwise support a means for displaying, at the user interface, information associated with the second blockchain transaction, where the information includes an indication of the transfer fee. In some examples, the transaction approval interface 580 may be configured as or otherwise support a means for receiving, at the user interface, an indication of acceptance of the information associated with the second blockchain transaction, where the second blockchain transaction is broadcast based on receiving the indication of acceptance.

In some examples, to support generating the second blockchain transaction, the network fee component 585 may be configured as or otherwise support a means for determining a suggested network fee that is suggested by a network associated with the blockchain. In some examples, to support generating the second blockchain transaction, the network fee component 585 may be configured as or otherwise support a means for determining the transfer fee that is higher than the suggested network fee. In some examples, the crypto token is a fungible token, a non-fungible token, or a layer two token.

Figure 6:
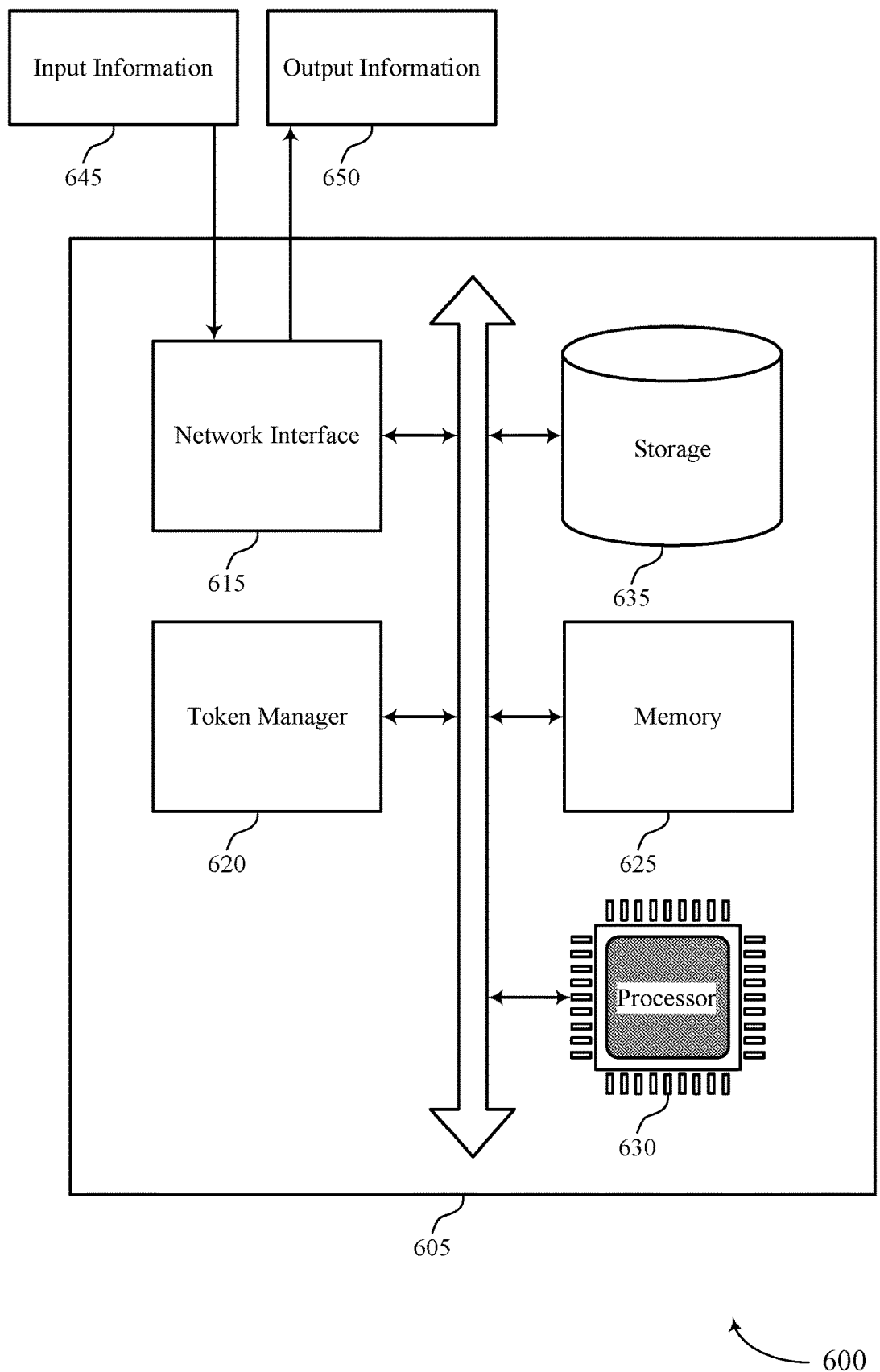
FIG. 6 illustrates a diagram of a system including a device that supports token recovery in accordance with aspects of the present disclosure.

FIG. 6 illustrates a block diagram 600 of a system 605 that supports token recovery in accordance with aspects of the present disclosure. The system 605 may be an example of or include the components of a system 405 as described herein. The system 605 may include components for bi-directional data communications including components for transmitting and receiving communications, such as a token manager 620, network interface 615, a memory 625, a processor 630, and a storage 635. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a custodial token platform 110.

The network interface 615 may enable the system 605 to exchange information (e.g., input information 645, output information 650, or both) with other systems or devices (not shown). For example, the network interface 615 may enable the system 605 to connect to a network (e.g., a blockchain network 105 or a network 135, as described herein). The network interface 615 may include one or more wireless network interfaces, one or more wired network interfaces, or any combination thereof. In some examples, the network interface 615 may be an example of may be an example of aspects of one or more components of the custodial token platform described with reference to FIG. 1.

Memory 625 may include random access memory (RAM), read only memory (ROM), or both. The memory 625 may store computer-readable, computer-executable software including instructions that, when executed, cause the processor 630 to perform various functions described herein. In some cases, the memory 625 may contain, among other things, a basic input/output system (BIOS), which may control basic hardware or software operation such as the interaction with peripheral components or devices. In some cases, the memory 625 may be an example of aspects of one or more components of a custodial token platform described with reference to FIG. 1.

The processor 630 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 630 may be configured to execute computer-readable instructions stored in a memory 625 to perform various functions (e.g., functions or tasks supporting token recovery Though a single processor 630 is depicted in the example of FIG. 6, it is to be understood that the system 605 may include any quantity of one or more of processors 630 and that a group of processors 630 may collectively perform one or more functions ascribed herein to a processor, such as the processor 630. In some cases, the processor 630 may be an example of aspects of one or more components of a custodial token platform described with reference to FIG. 1.

Storage 635 may be configured to store data that is generated, processed, stored, or otherwise used by the system 605. In some cases, the storage 635 may include one or more hard disc drives (HDDs), one or more solid state drives (SSDs), or both. In some examples, the storage 635 may be an example of a single database, a distributed database, multiple distributed databases, a data store, a data lake, or an emergency backup database. In some examples, the storage 635 may be an example of one or more components of a custodial token platform described with reference to FIG. 1.

The token manager 620 may support digital token management in accordance with examples as disclosed herein. For example, the token manager 620 may be configured as or otherwise support a means for receiving, via a user interface of a custodial token platform, an identifier of a first blockchain transaction that is associated with a crypto token that is not supported by the custodial token platform and that is to be recovered from an inbound address of the custodial token platform. The token manager 620 may be configured as or otherwise support a means for displaying, based on receiving the identifier of the first blockchain transaction, information associated with the first blockchain transaction, the information identified from a blockchain associated with the first blockchain transaction. The token manager 620 may be configured as or otherwise support a means for receiving, via the user interface, an indication of a user address associated with a user, the user address being external to the custodial token platform. The token manager 620 may be configured as or otherwise support a means for verifying, based at least in part on receiving the indication of the user address, that a message is signed by a private key associated with the user address. The token manager 620 may be configured as or otherwise support a means for broadcasting, subsequent to verifying that the message is signed, a second blockchain transaction configured to transfer the crypto token from the inbound address to the user address.

Figure 7:
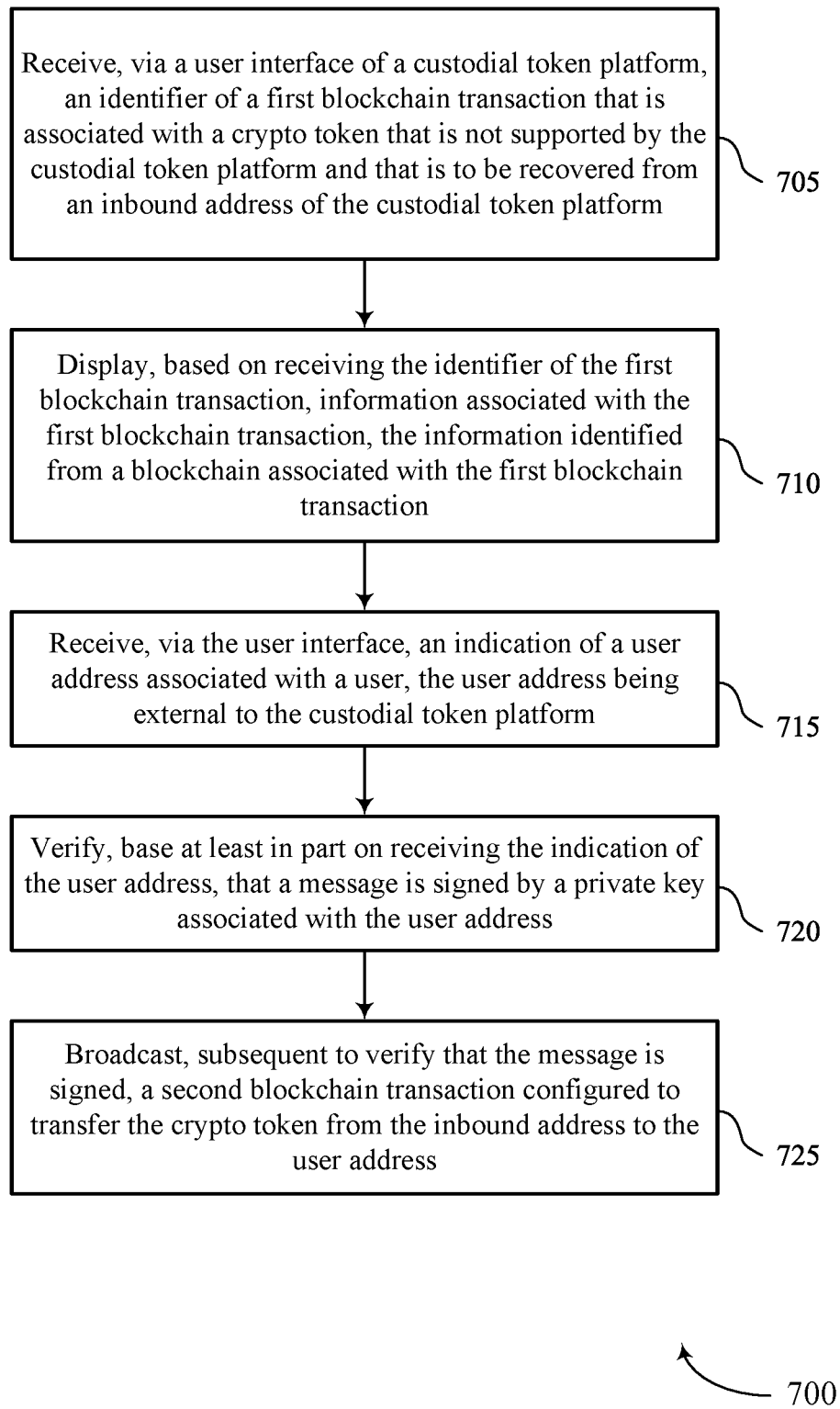
FIGS. 7 through 9 illustrate flowcharts showing methods that support token recovery in accordance with aspects of the present disclosure.

FIG. 7 illustrates a flowchart showing a method 700 that supports token recovery in accordance with aspects of the present disclosure. The operations of the method 700 may be implemented by a server or its components as described herein. For example, the operations of the method 700 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 705, the method may include receiving, via a user interface of a custodial token platform, an identifier of a first blockchain transaction that is associated with a crypto token that is not supported by the custodial token platform and that is to be recovered from an inbound address of the custodial token platform. The operations of 705 may be performed in accordance with examples as disclosed herein. In some examples, aspects of the operations of 705 may be performed by a transaction identifier interface 525 as described with reference to FIG. 5.

At 710, the method may include displaying, based on receiving the identifier of the first blockchain transaction, information associated with the first blockchain transaction, the information identified from a blockchain associated with the first blockchain transaction. The operations of 710 may be performed in accordance with examples as disclosed herein. In some examples, aspects of the operations of 710 may be performed by a transaction information component 530 as described with reference to FIG. 5.

At 715, the method may include receiving, via the user interface, an indication of a user address associated with a user, the user address being external to the custodial token platform. The operations of 715 may be performed in accordance with examples as disclosed herein. In some examples, aspects of the operations of 715 may be performed by a user address interface 535 as described with reference to FIG. 5.

At 720, the method may include verifying, based on receiving the indication of the user address, that a message is signed by a private key associated with the user address. The operations of 720 may be performed in accordance with examples as disclosed herein. In some examples, aspects of the operations of 720 may be performed by a message verification component 540 as described with reference to FIG. 5.

At 725, the method may include broadcasting, subsequent to verifying that the message is signed, a second blockchain transaction configured to transfer the crypto token from the inbound address to the user address. The operations of 725 may be performed in accordance with examples as disclosed herein. In some examples, aspects of the operations of 725 may be performed by a transaction broadcast component 545 as described with reference to FIG. 5.

Figure 8:
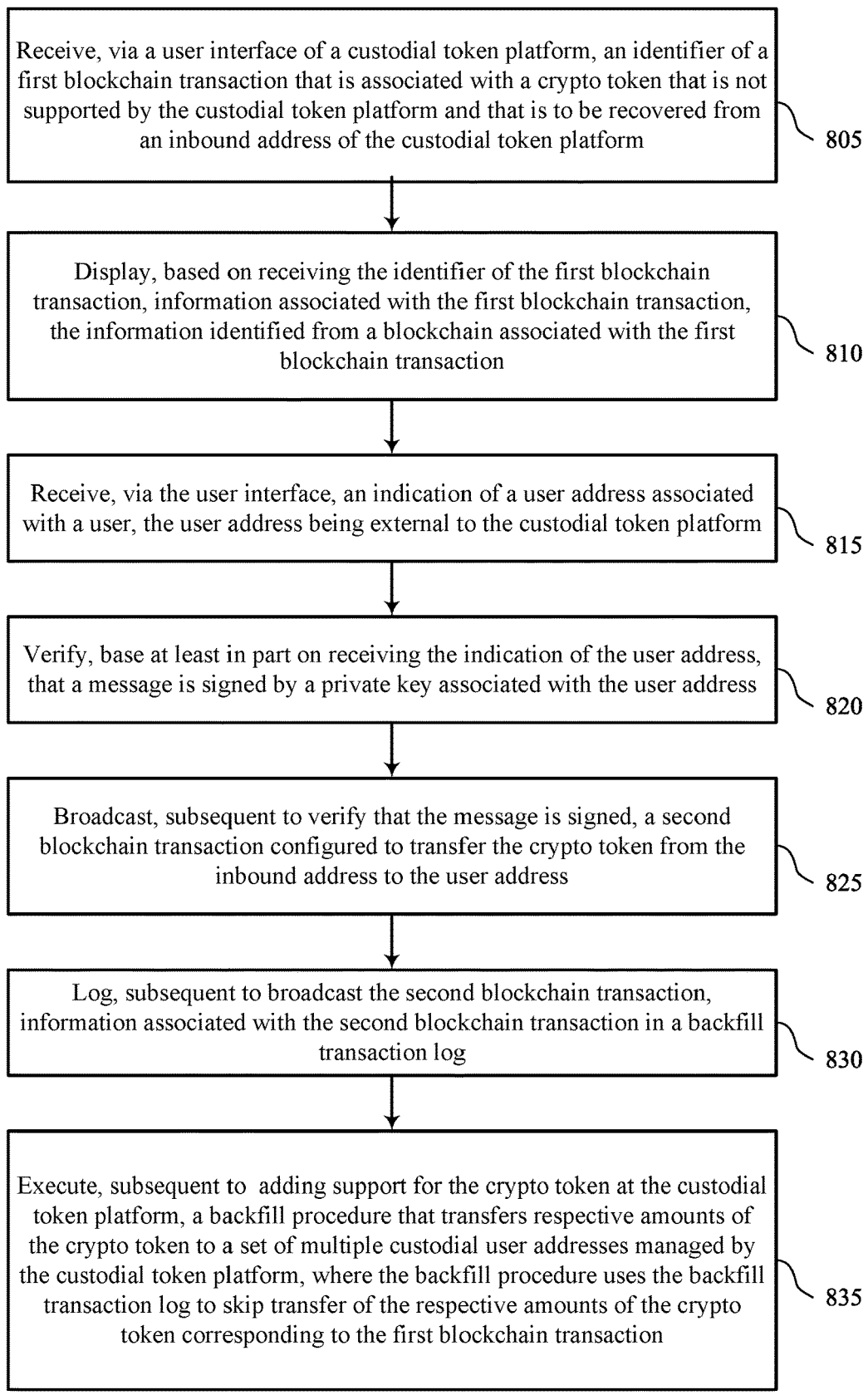

FIG. 8 illustrates a flowchart showing a method 800 that supports token recovery in accordance with aspects of the present disclosure. The operations of the method 800 may be implemented by a server or its components as described herein. For example, the operations of the method 800 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 805, the method may include receiving, via a user interface of a custodial token platform, an identifier of a first blockchain transaction that is associated with a crypto token that is not supported by the custodial token platform and that is to be recovered from an inbound address of the custodial token platform. The operations of 805 may be performed in accordance with examples as disclosed herein. In some examples, aspects of the operations of 805 may be performed by a transaction identifier interface 525 as described with reference to FIG. 5.

At 810, the method may include displaying, based on receiving the identifier of the first blockchain transaction, information associated with the first blockchain transaction, the information identified from a blockchain associated with the first blockchain transaction. The operations of 810 may be performed in accordance with examples as disclosed herein. In some examples, aspects of the operations of 810 may be performed by a transaction information component 530 as described with reference to FIG. 5.

At 815, the method may include receiving, via the user interface, an indication of a user address associated with a user, the user address being external to the custodial token platform. The operations of 815 may be performed in accordance with examples as disclosed herein. In some examples, aspects of the operations of 815 may be performed by a user address interface 535 as described with reference to FIG. 5.

At 820, the method may include verifying, based on receiving the indication of the user address, that a message is signed by a private key associated with the user address. The operations of 820 may be performed in accordance with examples as disclosed herein. In some examples, aspects of the operations of 820 may be performed by a message verification component 540 as described with reference to FIG. 5.

At 825, the method may include broadcasting, subsequent to verifying that the message is signed, a second blockchain transaction configured to transfer the crypto token from the inbound address to the user address. The operations of 825 may be performed in accordance with examples as disclosed herein. In some examples, aspects of the operations of 825 may be performed by a transaction broadcast component 545 as described with reference to FIG. 5.

At 830, the method may include logging, subsequent to broadcasting the second blockchain transaction, information associated with the second blockchain transaction in a backfill transaction log. The operations of 830 may be performed in accordance with examples as disclosed herein. In some examples, aspects of the operations of 830 may be performed by a transaction log component 550 as described with reference to FIG. 5.

At 835, the method may include executing, subsequent to adding support for the crypto token at the custodial token platform, a backfill procedure that credits respective amounts of the crypto token to a plurality of user accounts managed by the custodial token platform, where the backfill procedure uses the backfill transaction log to skip crediting of the respective amounts of the crypto token corresponding to the first blockchain transaction. The operations of 835 may be performed in accordance with examples as disclosed herein. In some examples, aspects of the operations of 835 may be performed by a back procedure component 555 as described with reference to FIG. 5.

Figure 9:
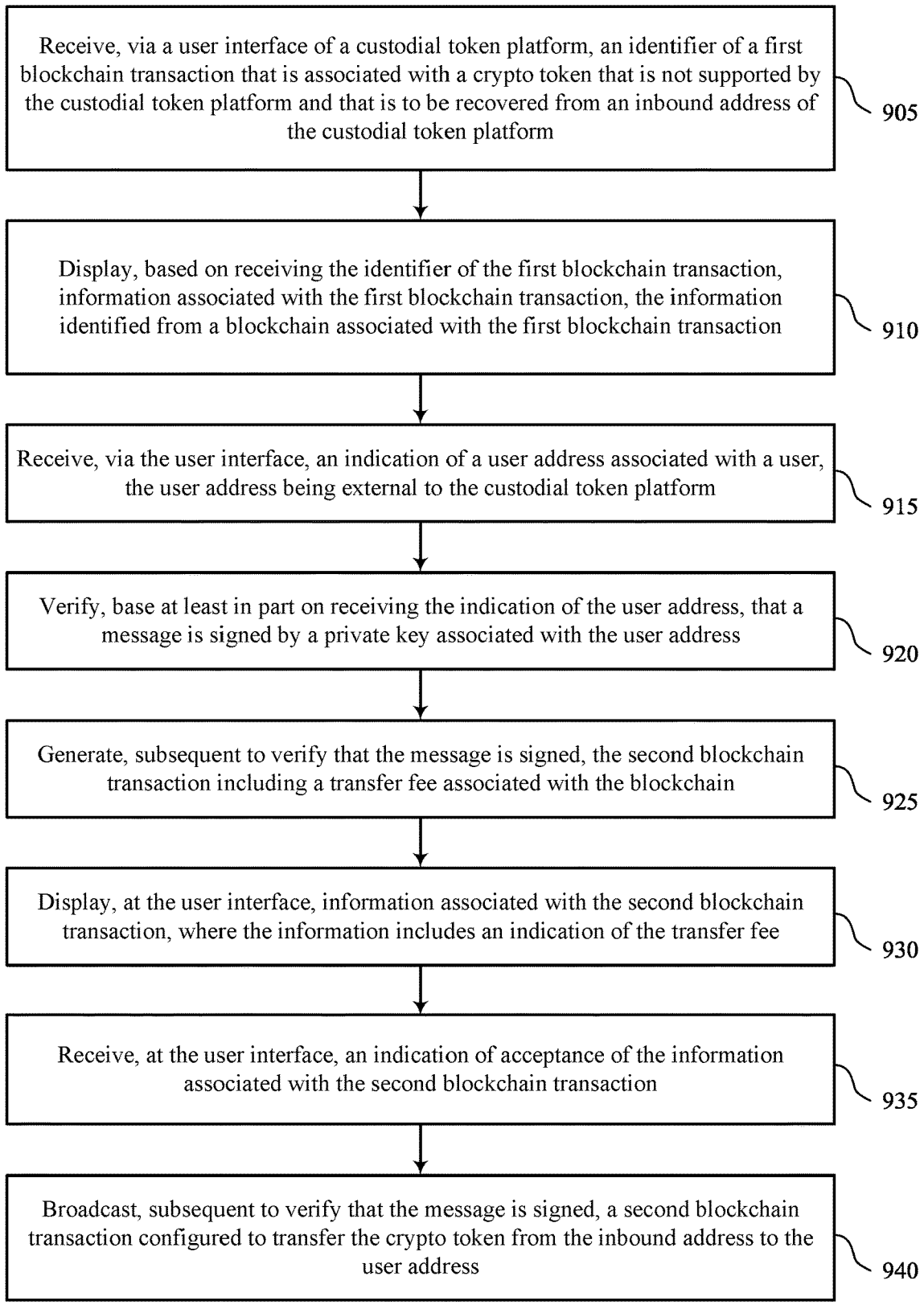

FIG. 9 illustrates a flowchart showing a method 900 that supports token recovery in accordance with aspects of the present disclosure. The operations of the method 900 may be implemented by a server or its components as described herein. For example, the operations of the method 900 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 905, the method may include receiving, via a user interface of a custodial token platform, an identifier of a first blockchain transaction that is associated with a crypto token that is not supported by the custodial token platform and that is to be recovered from an inbound address of the custodial token platform. The operations of 905 may be performed in accordance with examples as disclosed herein. In some examples, aspects of the operations of 905 may be performed by a transaction identifier interface 525 as described with reference to FIG. 5.

At 910, the method may include displaying, based on receiving the identifier of the first blockchain transaction, information associated with the first blockchain transaction, the information identified from a blockchain associated with the first blockchain transaction. The operations of 910 may be performed in accordance with examples as disclosed herein. In some examples, aspects of the operations of 910 may be performed by a transaction information component 530 as described with reference to FIG. 5.

At 915, the method may include receiving, via the user interface, an indication of a user address associated with a user, the user address being external to the custodial token platform. The operations of 915 may be performed in accordance with examples as disclosed herein. In some examples, aspects of the operations of 915 may be performed by a user address interface 535 as described with reference to FIG. 5.

At 920, the method may include verifying, based on receiving the indication of the user address, that a message is signed by a private key associated with the user address. The operations of 920 may be performed in accordance with examples as disclosed herein. In some examples, aspects of the operations of 920 may be performed by a message verification component 540 as described with reference to FIG. 5.

At 925, the method may include generating, subsequent to verifying that the message is signed, the second blockchain transaction including a transfer fee associated with the blockchain. The operations of 925 may be performed in accordance with examples as disclosed herein. In some examples, aspects of the operations of 925 may be performed by a transaction generation component 575 as described with reference to FIG. 5.

At 930, the method may include displaying, at the user interface, information associated with the second blockchain transaction, where the information includes an indication of the transfer fee. The operations of 930 may be performed in accordance with examples as disclosed herein. In some examples, aspects of the operations of 930 may be performed by a transaction information component 530 as described with reference to FIG. 5.

At 935, the method may include receiving, at the user interface, an indication of acceptance of the information associated with the second blockchain transaction. The operations of 935 may be performed in accordance with examples as disclosed herein. In some examples, aspects of the operations of 935 may be performed by a transaction approval interface 580 as described with reference to FIG. 5.

At 940, the method may include broadcasting, subsequent to verifying that the message is signed, a second blockchain transaction configured to transfer the crypto token from the inbound address to the user address. The operations of 940 may be performed in accordance with examples as disclosed herein. In some examples, aspects of the operations of 940 may be performed by a transaction broadcast component 545 as described with reference to FIG. 5.

A method for digital token management is described. The method may include receiving, via a user interface of a custodial token platform, an identifier of a first blockchain transaction that is associated with a crypto token that is not supported by the custodial token platform and that is to be recovered from an inbound address of the custodial token platform, displaying, based on receiving the identifier of the first blockchain transaction, information associated with the first blockchain transaction, the information identified from a blockchain associated with the first blockchain transaction, receiving, via the user interface, an indication of a user address associated with a user, the user address being external to the custodial token platform, verifying, based on receiving the indication of the user address, that a message is signed by a private key associated with the user address, and broadcasting, subsequent to verifying that the message is signed, a second blockchain transaction configured to transfer the crypto token from the inbound address to the user address.

An apparatus for digital token management is described. The apparatus may include a processor, memory coupled with the processor, and instructions stored in the memory. The instructions may be executable by the processor to cause the apparatus to receive, via a user interface of a custodial token platform, an identifier of a first blockchain transaction that is associated with a crypto token that is not supported by the custodial token platform and that is to be recovered from an inbound address of the custodial token platform, display, based on receiving the identifier of the first blockchain transaction, information associated with the first blockchain transaction, the information identified from a blockchain associated with the first blockchain transaction, receive, via the user interface, an indication of a user address associated with a user, the user address being external to the custodial token platform, verifying, based at least in part on receiving the indication of the user address, that a message is signed by a private key associated with the user address, and broadcasting, subsequent to verify that the message is signed, a second blockchain transaction configured to transfer the crypto token from the inbound address to the user address.

Another apparatus for digital token management is described. The apparatus may include means for receiving, via a user interface of a custodial token platform, an identifier of a first blockchain transaction that is associated with a crypto token that is not supported by the custodial token platform and that is to be recovered from an inbound address of the custodial token platform, means for displaying, based on receiving the identifier of the first blockchain transaction, information associated with the first blockchain transaction, the information identified from a blockchain associated with the first blockchain transaction, means for receiving, via the user interface, an indication of a user address associated with a user, the user address being external to the custodial token platform, means for verifying, based on receiving the indication of the user address, that a message is signed by a private key associated with the user address, and means for broadcasting, subsequent to verifying that the message is signed, a second blockchain transaction configured to transfer the crypto token from the inbound address to the user address.

A non-transitory computer-readable medium storing code for digital token management is described. The code may include instructions executable by a processor to receive, via a user interface of a custodial token platform, an identifier of a first blockchain transaction that is associated with a crypto token that is not supported by the custodial token platform and that is to be recovered from an inbound address of the custodial token platform, display, based on receiving the identifier of the first blockchain transaction, information associated with the first blockchain transaction, the information identified from a blockchain associated with the first blockchain transaction, receive, via the user interface, an indication of a user address associated with a user, the user address being external to the custodial token platform, verifying, based at least in part on receiving the indication of the user address, that a message is signed by a private key associated with the user address, and broadcasting, subsequent to verify that the message is signed, a second blockchain transaction configured to transfer the crypto token from the inbound address to the user address.

In some examples of the method, apparatuses, and non-transitory computer-readable medium described herein, logging, subsequent to broadcasting the second blockchain transaction, information associated with the second blockchain transaction in a backfill transaction log and executing, subsequent to adding support for the crypto token at the custodial token platform, a backfill procedure that credits respective amounts of the crypto token to a plurality of user accounts managed by the custodial token platform, where the backfill procedure uses the backfill transaction log to skip crediting of the respective amounts of the crypto token corresponding to the first blockchain transaction.

In some examples of the method, apparatuses, and non-transitory computer-readable medium described herein, logging the second blockchain transaction may include operations, features, means, or instructions for logging an identifier for the crypto token, an amount of the crypto token transferred via the second blockchain transaction, an identifier of a user associated with the user address, or a combination thereof.

Some examples of the method, apparatuses, and non-transitory computer-readable medium described herein may further include operations, features, means, or instructions for monitoring the blockchain for transactions associated with the inbound address, identifying, based on monitoring the blockchain, that the crypto token may be transferred to the inbound address, comparing the crypto token to a list of crypto tokens supported by the custodial token platform, and determining, based on a result of the comparing, to refrain from moving the crypto token from the inbound address to another address managed by the custodial token platform.

In some examples of the method, apparatuses, and non-transitory computer-readable medium described herein, generating, subsequent to verifying that the message may be signed, the second blockchain transaction including a transfer fee associated with the blockchain, displaying, at the user interface, information associated with the second blockchain transaction, where the information includes an indication of the transfer fee, and receiving, at the user interface, an indication of acceptance of the information associated with the second blockchain transaction, where the second blockchain transaction may be broadcast based on receiving the indication of acceptance.

In some examples of the method, apparatuses, and non-transitory computer-readable medium described herein, generating the second blockchain transaction may include operations, features, means, or instructions for determining a suggested network fee that may be suggested by a network associated with the blockchain and determining the transfer fee that may be higher than the suggested network fee.

In some examples of the method, apparatuses, and non-transitory computer-readable medium described herein, the crypto token may be a fungible token, a non-fungible token, or a layer two token.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for digital token management, comprising:

receiving, at an inbound address of a user account of a custodial token platform and in accordance with a first blockchain transaction recorded on a blockchain ledger of a blockchain network, deposit of a crypto token that is not tradable on or accessible via the custodial token platform, wherein the inbound address is associated with a first private key used to digitally sign transactions transmitted from the inbound address, the first private key being managed by the custodial token platform;

receiving, via a user interface of the custodial token platform, a request for recovery of the crypto token from the inbound address;

receiving, via the user interface of the custodial token platform, an identifier of the first blockchain transaction comprising the deposit of the crypto token at the inbound address of the user account of the custodial token platform;

displaying, based at least in part on receiving the identifier of the first blockchain transaction and on the crypto token not being tradable on or accessible via the custodial token platform, information associated with the first blockchain transaction, the information identified from the blockchain ledger of the blockchain network, the blockchain ledger storing the first blockchain transaction;

receiving, via the user interface, an indication of a user address associated with a second private key used to digitally sign transactions transmitted from the user address and associated with a user, the second private key being managed by the user and the user address being external to the custodial token platform;

verifying, based at least in part on receiving the indication of the user address, that a message is digitally signed by the second private key managed by the user;

broadcasting, subsequent to verifying that the message is signed by the second private key, a second blockchain transaction that transfers the crypto token from the inbound address to the user address, wherein the crypto token is transferred from the inbound address to the user address after verification of the second blockchain transaction by one or more nodes of a plurality of nodes of the blockchain network, wherein broadcasting the second blockchain transaction that transfers the crypto token from the inbound address to the user address recovers the crypto token from the inbound address; and transmitting, after broadcasting the second blockchain transaction and to a user of the user account of the custodial token platform, a notification of recovery of the crypto token from the inbound address.

2. The method of claim 1, further comprising:

logging, subsequent to broadcasting the second blockchain transaction, information associated with the second blockchain transaction in a backfill transaction log; and executing, subsequent to adding support for the crypto token at the custodial token platform, a backfill procedure that credits respective amounts of the crypto token to a plurality of user accounts managed by the custodial token platform, wherein the backfill procedure uses the backfill transaction log to skip crediting of the respective amounts of the crypto token corresponding to the first blockchain transaction.

3. The method of claim 2, wherein logging the second blockchain transaction comprises:

logging an identifier for the crypto token, an amount of the crypto token transferred via the second blockchain transaction, an identifier of a user associated with the user address, or a combination thereof.

4. The method of claim 1, further comprising:

monitoring the blockchain ledger for transactions associated with the inbound address;

identifying, based at least in part on monitoring the blockchain ledger, that the crypto token is transferred to the inbound address;

comparing the crypto token to a list of crypto tokens supported by the custodial token platform; and determining, based at least in part on a result of the comparing, to refrain from moving the crypto token from the inbound address to another address managed by the custodial token platform.

5. The method of claim 1, further comprising:

generating, subsequent to verifying that the message is signed, the second blockchain transaction including a transfer fee associated with the blockchain network;

displaying, at the user interface, information associated with the second blockchain transaction, wherein the information includes an indication of the transfer fee; and receiving, at the user interface, an indication of acceptance of the information associated with the second blockchain transaction, wherein the second blockchain transaction is broadcast based at least in part on receiving the indication of acceptance.

6. The method of claim 5, wherein generating the second blockchain transaction comprises:

determining a suggested network fee that is suggested by a network associated with the blockchain network; and determining the transfer fee that is higher than the suggested network fee.

7. The method of claim 1, wherein the crypto token is a fungible token, a non-fungible token, or a layer two token.

8. An apparatus for digital token management, comprising:

a processor;

memory coupled with the processor; and instructions stored in the memory and executable by the processor to cause the apparatus to:

receive, at an inbound address of a user account of a custodial token platform and in accordance with a first blockchain transaction recorded on a blockchain ledger of a blockchain network, deposit of a crypto token that is not tradable on or accessible via the custodial token platform, wherein the inbound address is associated with a first private key used to digitally sign transactions transmitted from the inbound address, the first private key being managed by the custodial token platform;

receive, via a user interface of the custodial token platform, a request for recovery of the crypto token from the inbound address;

receive, via the user interface of the custodial token platform, an identifier of the first blockchain transaction comprising the deposit of the crypto token at the inbound address of the user account of the custodial token platform;

display, based at least in part on receiving the identifier of the first blockchain transaction and on the crypto token not being tradable on or accessible via the custodial token platform, information identified associated with the first blockchain transaction, the information identified from the blockchain ledger of the blockchain network, the blockchain ledger storing the first blockchain transaction;

receive, via the user interface, an indication of a user address associated with a second private key used to digitally sign transactions transmitted from the user address and associated with a user, the second private key being managed by the user and the user address being external to the custodial token platform;

verify, based at least in part on receiving the indication of the user address, that a message is digitally signed by the second private key managed by the user;

broadcast, subsequent to verifying that the message is signed by the second private key, a second blockchain transaction that transfers the crypto token from the inbound address to the user address, wherein the crypto token is transferred from the inbound address to the user address after verification of the second blockchain transaction by one or more nodes of a plurality of nodes of the blockchain network, wherein broadcasting the second blockchain transaction that transfers the crypto token from the inbound address to the user address recovers the crypto token from the inbound address; and transmit, after broadcasting the second blockchain transaction and to a user of the user account of the custodial token platform, a notification of recovery of the crypto token from the inbound address.

9. The apparatus of claim 8, wherein the instructions are further executable by the processor to cause the apparatus to:
log, subsequent to broadcast the second blockchain transaction, information associated with the second blockchain transaction in a backfill transaction log; and
execute, subsequent to adding support for the crypto token at the custodial token platform, a backfill procedure that credits respective amounts of the crypto token to a plurality of user accounts managed by the custodial token platform, wherein the backfill procedure uses the backfill transaction log to skip crediting of the respective amounts of the crypto token corresponding to the first blockchain transaction.

10. The apparatus of claim 9, wherein the instructions to log the second blockchain transaction are executable by the processor to cause the apparatus to:
log an identifier for the crypto token, an amount of the crypto token transferred via the second blockchain transaction, an identifier of a user associated with the user address, or a combination thereof.

11. The apparatus of claim 8, wherein the instructions are further executable by the processor to cause the apparatus to:
monitor the blockchain ledger for transactions associated with the inbound address;
identify, based at least in part on monitoring the blockchain ledger, that the crypto token is transferred to the inbound address;
compare the crypto token to a list of crypto tokens supported by the custodial token platform; and
determine, based at least in part on a result of the comparing, to refrain from moving the crypto token from the inbound address to another address managed by the custodial token platform.

12. The apparatus of claim 8, wherein the instructions are further executable by the processor to cause the apparatus to:
generate, subsequent to verify that the message is signed, the second blockchain transaction including a transfer fee associated with the blockchain network;
display, at the user interface, information associated with the second blockchain transaction, wherein the information includes an indication of the transfer fee; and
receive, at the user interface, an indication of acceptance of the information associated with the second blockchain transaction, wherein the second blockchain transaction is broadcast based at least in part on receiving the indication of acceptance.

13. The apparatus of claim 12, wherein the instructions to generate the second blockchain transaction are executable by the processor to cause the apparatus to:
determine a suggested network fee that is suggested by a network associated with the blockchain network; and
determine the transfer fee that is higher than the suggested network fee.

14. The apparatus of claim 8, wherein the crypto token is a fungible token, a non-fungible token, or a layer two token.

15. A non-transitory computer-readable medium storing code for digital token management, the code comprising instructions executable by a processor to:
receive, at an inbound address of a user account of a custodial token platform and in accordance with a first blockchain transaction recorded on a blockchain ledger of a blockchain network, deposit of a crypto token that is not tradable on or accessible via the custodial token platform, wherein the inbound address is associated with a first private key used to digitally sign transactions transmitted from the inbound address, the first private key being managed by the custodial token platform;
receive, via a user interface of the custodial token platform, a request for recovery of the crypto token from the inbound address;
receive, via the user interface of the custodial token platform, an identifier of the first blockchain transaction comprising the deposit of the crypto token at the inbound address of the user account of the custodial token platform;
displaying, based at least in part on receiving the identifier of the first blockchain transaction and on the crypto token not being tradable on or accessible via the custodial token platform, information associated with the first blockchain transaction, the information identified from the blockchain ledger of the blockchain network, the blockchain ledger storing the first blockchain transaction;
receive, via the user interface, an indication of a user address associated with a second private key used to digitally sign transactions transmitted from the user address and associated with a user, the second private key being managed by the user and the user address being external to the custodial token platform;
verify, based at least in part on receiving the indication of the user address, that a message is digitally signed by the second private key managed by the user;
broadcast, subsequent to verifying that the message is signed by the second private key, a second blockchain transaction that transfers the crypto token from the inbound address to the user address, wherein the crypto token is transferred from the inbound address to the user address after verification of the second blockchain transaction by one or more nodes of a plurality of nodes of the blockchain network, wherein broadcasting the second blockchain transaction that transfers the crypto token from the inbound address to the user address recovers the crypto token from the inbound address; and
transmit, after broadcasting the second blockchain transaction and to a user of the user account of the custodial token platform, a notification of recovery of the crypto token from the inbound address.

16. The non-transitory computer-readable medium of claim 15, wherein the instructions are further executable by the processor to:
log, subsequent to broadcast the second blockchain transaction, information associated with the second blockchain transaction in a backfill transaction log; and
execute, subsequent to adding support for the crypto token at the custodial token platform, a backfill procedure that credits respective amounts of the crypto token to a plurality of user accounts managed by the custodial token platform, wherein the backfill procedure uses the backfill transaction log to skip crediting of the respective amounts of the crypto token corresponding to the first blockchain transaction.

17. The non-transitory computer-readable medium of claim 16, wherein the instructions to log the second blockchain transaction are executable by the processor to:
log an identifier for the crypto token, an amount of the crypto token transferred via the second blockchain transaction, an identifier of a user associated with the user address, or a combination thereof.

18. The non-transitory computer-readable medium of claim 15, wherein the instructions are further executable by the processor to:

monitor the blockchain ledger for transactions associated with the inbound address;

identify, based at least in part on monitoring the blockchain ledger, that the crypto token is transferred to the inbound address;

compare the crypto token to a list of crypto tokens supported by the custodial token platform; and determine, based at least in part on a result of the comparing, to refrain from moving the crypto token from the inbound address to another address managed by the custodial token platform.

19. The non-transitory computer-readable medium of claim 15, wherein the instructions are further executable by the processor to:

generating, subsequent to verify that the message is signed, the second blockchain transaction including a transfer fee associated with the blockchain network;

display, at the user interface, information associated with the second blockchain transaction, wherein the information includes an indication of the transfer fee; and receive, at the user interface, an indication of acceptance of the information associated with the second blockchain transaction, wherein the second blockchain transaction is broadcast based at least in part on receiving the indication of acceptance.

20. The non-transitory computer-readable medium of claim 19, wherein the instructions to generate the second blockchain transaction are executable by the processor to:

determine a suggested network fee that is suggested by a network associated with the blockchain network; and determine the transfer fee that is higher than the suggested network fee.

\* \* \* \* \*